Patented May 3, 1938

2,116,089

UNITED STATES PATENT OFFICE 2,116,089

DEPROTEINIZATION OF RUBBER LATEX

Leo Wallerstein, New York, N. Y.

No Drawing. Application December 31, 1935,
Serial No. 57,015

10 Claims. (Cl. 18—50)

The present invention relates to the treatment of latices, such as rubber latex, and it particularly relates to the treatment of such hydrocarbon suspensions to remove non-hydrocarbon materials, such as protein, therefrom while maintaining the suspension.

It has been found that the protein content of rubber disadvantageously affects the electrical characteristics of the rubber, and particularly decreases its desirable insulating and dielectric qualities, particularly when the rubber is utilized where it is in contact with water for long periods of time, as in submarine cables.

In addition the non-hydrocarbon or protein materials usually present in rubber latex and consequently in coagulated rubber itself, as well as other similar coagulated hydrocarbons, disadvantageously affect the quality of the rubber, its chemical reactivity and the readiness with which it is converted by chemical and/or physical treatments.

Since non-hydrocarbon protein materials occur in rubber in very small amounts, it is not satisfactory to employ treatments to remove this small percentage of material, which might at all substantially affect the rubber hydrocarbon itself. Treatments of large masses of rubber after coagulation or separation from latex, as for example with water with high temperature and pressure for extended periods of time and/or by putrefaction of the latex are not economical, nor are they particularly effective in reducing the protein content.

An object of this invention is to prepare rubber latex in a relatively high state of purity with a substantial reduction in the nitrogen or protein content without the necessity of utilizing extended treatments at high temperatures and pressures over extended periods of time and which will not cause any undesirable change or alteration in the valuable hydrocarbon constituents which it is desired to prepare in a high state of purity.

Another object is to prepare rubber latex substantially free of protein by a selective treatment which will eliminate and decrease the protein content to a desired degree without disadvantageously affecting other constituents thereof.

Another object is to provide a rubber latex deproteinization operation which may be carried out under such controlled and regulated conditions that the purification or removal treatment will proceed to the desired extent without the necessity of coagulating to remove the protein therefrom.

Another object is to provide a purified latex by a protein removing treatment which will not result in the occlusion of added impurities, and which will not tend to cause, or set up reactions tending to cause putrefaction and decomposition of the latex or rubber, although reagents of organic origin are utilized.

Other objects are in part obvious and in part pointed out hereinafter.

The most satisfactory enzyme preparations are those obtained by the growth and metabolic processes of bacteria such as *Bacillus mesentericus*, and *Bacillus subtilis* in nutrient media. If desired, the preparation may include the metabolic mixture with an antiseptic added or the precipitate obtained by adding alcohol or ammonium sulfate. The preparations when added to the latex should be preferably antiseptic to prevent any bacterial action or putrefaction of the latex, the deproteinization action desired being solely due to the enzymes.

In reacting the rubber hydrocarbon suspension of the latex with the enzyme material or mixture, it is desirable that the enzyme be used in relatively small quantities, yet sufficiently to solubilize the nitrogen protein content of the rubber material so that after creaming or removal of water it will be reduced from 33% to 80% within a period preferably not exceeding about 100 hours and ranging from 24 hours to 100 hours, or 1 to 4 days.

Usually, it is desirable to add such quantity of enzyme and of sufficient strength that the nitrogen protein content of the rubber material after creaming or removal of water will be reduced at least 66% in a period preferably from a few hours to about 48 hours.

The bacterial proteolytic enzyme is preferably always used in such concentrations and under such conditions that it will not of itself cause coagulation, although coagulation may be simultaneously or subsequently affected by suitable control of the pH value. In one embodiment of the invention a nitrogen content of between 0.32 and 0.335% was reduced to between 0.06% and 0.16% in from 6 to 40 hours.

In the enzyme reaction, the latex to which the enzyme is added may be utilized in fresh or preserved condition, or in undiluted condition or in concentrated condition. For example, it may be diluted by 1 to 5 volumes of water, the average dilution, if dilution is employed, usually being about 3 to 4 times.

The enzyme may be added to the latex as it comes from the tree in slightly acid or neutral condition, but it is to be understood that satisfactory enzyme action will also be obtained when the latex or sap of the rubber tree is made much more alkaline as by addition of ammonia.

Preferably, it is desirable that the pH may be slightly acid or near the neutral point and in any case should be below about 10 to 11 or below about 7 to 9, but it is to be understood that pH between about 4 to 5 and 8.5 to 9 may be employed, the preferred range of pH being preferably between 6 to 8.

The latex may also be treated immediately when it comes from the tree or it may be treated a substantial time thereafter as after it has been tanked and transported considerable distances and in the latter case the treatment may be carried out even with preserved latices or latices containing other ingredients not harming or causing deterioration of the enzyme.

The temperature may be that of the room or atmosphere of the reaction up to 50° C. or it may be controlled so that the average reaction temperature will be substantially more than atmospheric and be less than 60° C. which temperature may be maintained throughout the period of deproteinization. For example, the range of temperature may be from 40° C. to 60° C. and averaging about 45° C. to 50° C.

After the enzyme action has proceeded to the desired extent the water may be removed from or reduced in the latex so treated, as by creaming with well-known methods, as for example, by the use of gum arabic or by centrifuging, followed, if desired, by one or more subsequent additions of water and creaming operations.

The following are a few examples of some of the modes of carrying out the present invention, and they are given here for purpose of illustration and not by way of limitation:

Example 1

To 400 pounds or 50 gallons of a latex having a pH of 7 are added 31 pounds (14 liters) of proteolytic enzyme preparation of bacterial origin as previously described. The proper proportions of the enzyme may be readily determined by first conducting a small scale control process. This mixture is permitted to stand for about 40 hours at 45° C. to 60° C. and then the latex hydrocarbon is creamed. This treatment results in a reduction of the nitrogen content after washing of the rubber from between 0.32% and 0.35% to 0.07%.

Example 2

100 grams of preserved latex are diluted with 300 grams of water, and before, during, or after the dilution, about 4 c. c. of a proteolytic enzyme preparation, as above described, are added. With a pH of 10.5 and with an average temperature of 45° C., after about 20 hours the nitrogen protein content will have been reduced from 0.35% to 0.14%, after washing and removing solubilized protein.

If desired, the pH may be controlled by adding a small quantity of ammonia or by bubbling carbon dioxide through the mixture for a period of 5 to 8 minutes, and also, if desired, the time of digestion may be reduced to 6 to 18 hours.

Example 3

100 c. c. of latex are diluted with 400 c. c. of water and to the mixture before, during or after the dilution is added, 4 c. c. of a bacterial enzyme preparation. With a temperature of 46° to 48° for a period of 18 hours the nitrogen protein content may be readily reduced from 0.35% to between 0.09% and 0.1% after creaming and washing.

Example 4

100 c. c. of rubber latex are mixed with 400 c. c. of water and 5 c. c. of a bacterial enzyme preparation. Upon standing from 20 to 28 hours the protein nitrogen content after washing will be reduced from between 0.35% and 0.4% to 0.1%.

It is to be understood that other bacterial enzymes than those specifically disclosed above may be employed and the enzymes most satisfactorily utilized are those produced by the growth of aerobic bacteria upon previously sterilized nutrient medium with all possible sources of infection eliminated.

It is an important feature of the present invention that the deproteinization and removal of solubilized protein take place while the latex suspension is maintained and without decomposition of such latex.

But utilizing the bacterial enzymes above mentioned, it is possible to secure satisfactory deproteinization without particular adjustment of the pH of the latex which might tend to cause an undesirable alteration of the environment for the maintenance of a stable latex, since the enzymes above mentioned are sufficiently active over a relatively wide range of pH values.

The enzyme mixture should preferably be added in such quantity as to reduce the protein nitrogen content based upon the assumption of an initial nitrogen content of between 0.32% and 0.35% to between 0.060 and 0.16% after removal of the solubilized proteins based on the rubber hydrocarbon content.

Anti-oxidants may be added to the deproteinized rubber latex. The latex suspension produced by the present enzyme deproteinization appears to be more suitable for many purposes and to produce rubber deposits and coagulates having many superior properties.

It will thus be seen that there is herein described method in which the several features of this invention are embodied, and which method in its action attains the various objects of the invention and is well suited to meet the requirements of practical use.

As many changes could be made in the above method and many apparently widely different embodiments of this invention could be made without departing from the scope thereof, it is intended that all matter contained in the above description shall be interpreted as illustrative and not in a limiting sense.

Having thus described my invention, what I claim as new and desire to secure by Letters Patent is:—

1. A process of producing substantially deproteinized non-coagulated rubber latices which comprises providing a latex and adding an antiseptic bacterial proteolytic enzyme preparation, said preparation being devoid of living bacteria or materials causing putrefaction and being derived by the cultivation of *Bacilli mesentericus* or *subtilis*, followed by sterilization, allowing the reaction to continue without putrefaction for a sufficient length of time to solubilize a major part of, but not all of, the proteins and then removing water containing the solubilized protein materials without coagulation.

2. A process of producing substantially deproteinized non-coagulated rubber latices which comprises providing a latex and adding an antiseptic bacterial proteolytic enzyme preparation, said preparation being devoid of living bacteria or materials causing putrefaction and being derived by the cultivation of *Bacilli mesentericus* or *subtilis*, followed by sterilization, allowing the reaction to continue without putrefaction for a sufficient length of time to solubilize a major part of, but not all of the proteins and then removing water containing the solubilized protein materials by centrifuging.

3. A process of producing substantially deproteinized non-coagulated latices which comprises providing a latex, and adding an antiseptic bacterial proteolytic enzyme preparation, said preparation being devoid of living bacteria or materials causing putrefaction and being derived by the cultivation of *Bacilli mesentericus* or *subtilis*, followed by sterilization, allowing the reaction to continue without putrefaction for a sufficient length of time to solubilize a major part of, but not all of the proteins, then removing water containing the solubilized protein materials by centrifuging and washing and finally re-floating the material to re-form the latex.

4. A process of producing substantially deproteinized non-coagulated rubber latices which comprises providing a latex and adding a bacterial proteolytic enzyme preparation, said preparation being devoid of living bacteria or materials causing putrefaction and being derived by the cultivation of *Bacilli mesentericus* or *subtilis*, followed by sterilization, allowing the reaction to continue without putrefaction for a sufficient length of time to solubilize a major part of, but not all of the proteins, then removing water containing the solubilized protein materials by centrifuging, again adding water and repeating the water removal to assure further removal of the solubilized protein materials.

5. A process of producing substantially deproteinized rubber latex comprising providing a latex and reacting an active sterile bacterial enzyme preparation with the latex without putrefaction, said enzyme preparation being used under such conditions and concentrations as to be ineffective in itself in coagulating the rubber, but in sufficient quantity to solubilize a major portion between about 50 to 80 percent of the protein within 48 hours, and then discontinuing the action of the enzyme preparation.

6. A process of producing substantially deproteinized rubber latex comprising providing a latex and reacting a sterile bacterial enzyme preparation with the latex without putrefaction, the enzyme preparation being used in such concentrations as to solubilize about 66% of the protein in 12 to 24 hours, and then discontinuing the action of the enzyme preparation.

7. A process of producing substantially deproteinized rubber latex comprising providing a latex, reacting a sterile proteolytic enzyme preparation with the latex without putrefaction, and then washing, the pH being maintained at about 5 to 8 during the digestion operation.

8. A process of producing substantially deproteinized rubber latex comprising providing an alkaline latex, reacting a sterile bacterial protease preparation with the latex, said preparation being included in amounts ranging from 0.5 to 10% of the latex without putrefaction, without coagulating and then washing.

9. A process of producing substantially deproteinized rubber latex, comprising providing a latex, reacting an active sterile bacterial protease preparation with the latex, maintaining the pH of the latex so as to prevent coagulation, and dewatering the latex, the protease preparation being used in such amount as to reduce the protein nitrogen content of the rubber after washing to between 0.04 and 0.16% in from 6 to 48 hours.

10. A process of producing substantially deproteinized rubber latex which comprises providing a latex with a pH of between 5 and 8, adding a sterile proteolytic bacterial enzyme preparation, allowing the reaction to continue for 6 to 72 hours, centrifuging and washing.

LEO WALLERSTEIN.